Patented Nov. 10, 1953

2,658,895

UNITED STATES PATENT OFFICE 2,658,895

2-ALKYLPHENYL-3,4,5,6-TETRAHYDRO-PYRIMIDINES

Seaver A. Ballard and Richard R. Whetstone, Orinda, Calif., assignors to Shell Development Company, Emeryville, Calif., a corporation of Delaware No Drawing. Application December 26, 1950, Serial No. 202,824

5 Claims. (Cl. 260—251)

1

This invention relates to the provision of novel pyrimidine compounds of the type which may be termed 2 - alkylphenyl-3,4,5,6-tetrahydropyrimidines. These compounds have been found to possess utility in a wide variety of applications. Thus, they have excellent fungicidal and detergent properties and are also useful as asphalt additives. The compounds for the present invention have the structure

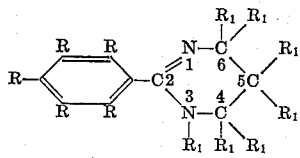

wherein at least one of the R's represents an alkyl radical and the remaining R's and all of the $R_1$'s are selected from the group consisting of the hydrogen atom and monovalent hydrocarbon radicals as, for example, the various aliphatic, aryl, alkaryl and aralkyl groups. In some cases the double bond shown above in the 1-2 position of the pyrimidine ring will be in the 2-3 position thereof. However, it is intended to include both of these structural variants in the graphic formula presented above.

The compounds of the present invention may be prepared by any one of a variety of methods. However, the preferred method is to react an alkyl-substituted benzoic acid with an alpha-gamma-alkylene-diamine (or salt thereof) in the presence of a dehydration catalyst. Thus, p-toluic acid can be reacted with 2-methyl-2,4-diaminopentane (diacetone diamine) to produce 2 - p - tolyl -4,4,6-trimethyl-3,4,5,6-tetrahydropyrimidine, the reaction proceding according to the equation,

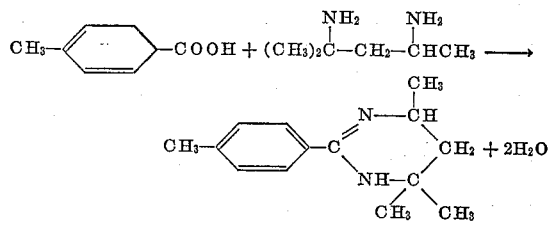

In place of the acid, the corresponding halide, anhydride, amide or ester may be used. Dehydration catalysts such as sulfuric or p-toluenesulfonic acids are effective, they normally being present in an amount between about 0.001 and 0.1 mole per mole of the acid reactant. Good results are obtained employing substantially equimolar proportions of the respective reactants, though preferably the diamine is present in excess. If desired, inert diluents such as benzene, toluene or xylene may be employed. If good yields are to be obtained, the reaction mixture is heated at temperatures between about 50 to 400° C. for periods of several hours, with the water of condensation being continuously removed from the mixture as the reaction progresses.

Representative compounds coming within the scope of the present invention (together with appropriate reactants for use in forming the same in accordance with the method described above) are indicated in the following table:

| Reactants | Products |
|---|---|
| 1. p-toluic acid+trimethylenediamine. | 2-p-tolyl-3,4,5,6-tetrahydropyrimidine. |
| 2. p-tert-butylbenzoic acid+1,3-diaminopentane. | 2-p-tert-butylphenyl-4-ethyl-1,4,5,6-tetrahydropyrimidine. |
| 3. 2,4-dimethylbenzoic acid+trimethylenediamine. | 2-(2,4-dimethylphenyl)-3,4,5,6 tetrahydropyrimidine. |
| 4. 2,4-dimethylbenzoic acid+1,3-diamino-5-phenylpentane. | 2 - (2,4 - dimethylphenyl) - 4 - ethylphenyl-1,4,5,6-tetrahydropyrimidine. |
| 5. p - toluic acid+1,3 - diamino -3 - phenyl-propane. | 2-p-tolyl-4-phenyl-3,4,5,6-tetrahydropyrimidine. |
| 6. 2-methyl-4-phenylbenzoic acid +trimethylene diamine. | 2 - (3 - methyl - 4 - biphenylyl) - 3,4,5,6-tetrahydropyrimidine. |
| 7. p-toluic acid+diacetone diamine. | 2-p-tolyl-4,4,6-trimethyl-3,4,5,6-tetrahydropyrimidine. |
| 8. p-tert-butylbenzoic acid+diacetone diamine. | 2 - p - tert - butylphenyl - 4,4,6 - trimethyl - 3,4,5,6 - tetra - hydropyrimidine. |
| 9. p-octylbenzoic acid+trimethylene diamine. | 2-p - octylphenyl -3,4,5,6-tetrahydropyrimidine. |
| 10. p - octylbenzoic acid+1,3 - diamino-3-phenyl-propane. | 2 - p - octylphenyl - 6 - phenyl - 3,4,5,6-tetrahydropyrimidine. |
| 11. 3,5-di-tert-butylbenzoic acid+diacetone diamine. | 2-(3,5 - di - tert - butylphenyl) - 4,4,6-trimethyl-3,4,5,6-tetrahydropyrimidine. |
| 12. 2,6-dimethyl-4-tert.-butylbenzoic acid+trimethylene diamine. | 2-(2,6-dimethyl-4-tert.-butyl-phenyl)-3,4,5,6-tetrahydropyrimidine. |
| 13. 2-methyl-4-phenylbenzoic acid +1,3-diamino-3-phenyl propane. | 2-(2-methyl-4-biphenylyl)-4-phenyl-3,4,5,6-tetrahydropyrimidine. |
| 14. p-toluic acid+2,4-diamino-6-phenyl-heptane. | 2-tolyl-4-(2-phenyl)-propyl-6-methyl-3,4,5,6-tetrahydropyrimidine. |

A preferred class of compounds of the present invention comprises the 2-alkylphenyl-3,4,5,6-tetrahydropyrimidines wherein all of the substituents on the respective phenyl and pyrimidine nuclei are selected from the group consisting of the hydrogen atom and alkyl radicals. Representative compounds falling within this preferred group are:

2-o-, m-, and p-tolyl-3,4,5,6-tetrahydropyrimidines

2-, o-, m-, and p-tert.-butylphenyl-3,4,5,6,-tetrahydropyrimidines 2-p-tert.-butylphenyl - 4,4,6-trimethyl-3,4,5,6-tetrahydropyrimidines 2 - p-octylphenyl-4,4,6-trimethyl-3,4,5,6-tetrahydropyrimidines, and 2 - (3,5 -dimethylphenyl) -4-methyl-3,4,5,6-tetrahydropyrimidine 2-p-tolyl-4-ethyl-1,4,5,6-tetrahydropyrimidine.

While the invention has been described above as it relates to the free 2-alkylphenyl-3,4,5,6- and 1,4,5,6-tetrahydropyrimidine compounds, the invention also covers the various salts of such compounds, e. g., the salts of benzoic, toluic, acetic, hydrochloric, sulfuric and phosphoric acids with such compounds as 2-tolyl-3,4,5,6-tetrahydropyrimidine, 2-tert.-butylphenyl-4,4,6-trimethyl-3,4,5,6-tetrahydropyrimidine 2-p-tolyl-4-ethyl-1,4,5,6-tetrahydropyrimidine and the like. These salts have utility for the same purposes as do the free pyrimidines, and the properties of the two types of compounds are very much the same.

All of the compounds of the present invention, including the various examples thereof given above, have utility in a wide variety of applications. However, they are particularly useful when employed as fungicides since they manifest outstanding fungicidal properties and yet have no appreciable phytotoxic activity when used in fungus-controlling proportions. The compounds also have detergent qualities and are usefully employed in detergent compositions. They also exert a stabilizing action when added to various natural and synthetic rubber compositions, particularly those associated with halogens. The compounds of the present invention also have the ability to improve the quality of asphalt compositions when added thereto.

The invention is illustrated in various if its embodiments by the following examples:

Example I p-tert.-butylbenzoic acid (0.7 mole) was heated with a small excess of diacetone diamine (2-methyl-2,4-diaminopentane) (0.9 mole) in 100 grams of xylene, there being employed 1 gram of p-toluenesulfonic acid as catalyst. The mixture was refluxed for 200 hours, with the water of condensation being distilled off as formed. The resulting reaction mixture was then subjected to fractional distillation under reduced pressure, with the 2-p-tert.-butylphenyl-4,4,6-trimethyl-3,4,5,6-tetrahydropyrimidine being recovered in 53% yield as the fraction boiling between 158 and 163° C. at 3 mm. Hg pressure. This product was a colorless, brittle, glassy solid, soluble in isopropyl alcohol, acetone and benzene, and slightly soluble in an aliphatic kerosene fraction. It was insoluble in water. It is considered that a portion of the product was also present as 2-p-tert.-butylphenyl, 4,4,6-trimethyl-1,4,5,6-tetrahydropyrimidine, the 3,4,5,6- and 1,4,5,6-tetrahydropyrimidine compounds having substantially the same properties.

Example II

The process of the foregoing example is repeated, but using trimethylenediamine instead of diacetone diamine as the reactant. In this case there is obtained the product 2-p-tert.-butylphenyl-3,4,5,6-tetrahydropyrimidine, which is but slightly lower boiling and otherwise has substantially the same physical and solubility characteristics as the product 2-p-tert.-butylphenyl-4,4,6 - trimethyl - 3,4,5,6 - tetrahydropyrimidine described in the foregoing example.

Example III

In this operation, 0.67 mole of methyl p-toluate was refluxed with 1 mole of diacetone diamine in the presence of 0.5 gram of p-toluenesulfonic acid. The refluxing, with simultaneous distillation of the water of reaction, was continued for approximately 8 hrs., at the end of which period a kettle temperature of 205° C. was reached. On distillation of the product reaction mixture, there were recovered 89 grams of the p-toluic acid salt of 2 - tolyl - 4,4,6 - trimethyl - 3,4,5,6 - tetrahydropyrimidine, which salt had a boiling point of 160° C. at 0.25 mm. Hg pressure, and appeared as a pale yellow, glassy solid. This salt was then dissolved in methanol and the solution treated with an alcoholic caustic solution, whereupon the sodium p-toluate precipitated out. The solution was then evaporated and redistilled to recover the free pyrimidine (2-p-tolyl-4,4,6-trimethyl-3,4,5,6-tetrahydropyrimidine) as a viscous oil boiling between 121 and 123° C. at 1 mm. Hg pressure. Here again, a portion of the product was considered to be 2-p-tolyl-4,4,6-trimethyl-1,4,5,6-tetrahydropyrimidine.

Example IV

In this example, 0.39 mole of p-octylbenzoic acid (derived from the alkylation of toluene with diisobutylene, followed by oxidation of the methyl group) was mixed with 0.66 mole of diacetone diamine in the presence of 0.25 gram of p-toluenesulfonic acid. Heating was continued until the reaction mixture was solid, and thereafter 100 ml. of toluene was added. The mixture was heated with distillation of toluene until a kettle temperature of 255° C. was reached. The amine salt recovered from the product was then treated with methanol and caustic and redistilled, as described in Example III, whereupon there was recovered 77 grams of the product 2-p-octylphenyl-4,4,6-trimethyl-3,4,5,6-tetrahydropyrimidine as the fraction boiling between 163–172° C. at 1–2 mm. Hg pressure. This material was a clear, yellow, glassy solid.

Example V

The general procedure outlined in Example IV above was followed in reacting 0.43 mole of 3,5-ditertiarybutylbenzoic acid with 0.8 mole of diacetone diamine. There is obtained, in the form of a hard, glassy solid, the product 2-(3,5-ditertiarybutylphenyl) - 4,4,6 - trimethyl - 3,4,5,6-tetrahydropyrimidine.

We claim as our invention:

1. A compound of the group consisting of tetrahydropyrimidines and acid salts thereof, which tetrahydropyrimidines are members of the group consisting of the 3,4,5,6-tetrahydropyrimidines and 4,4,6-trimethyl-3,4,5,6-tetrahydropyrimidines substituted in the 2-position by an alkyl phenyl radical of the group consisting of the para-tertiary butyl phenyl, para-octyl phenyl, and 3,5-ditertiary butyl phenyl radicals.

2. 2 - p - tert. - butylphenyl - 4,4,6 - trimethyl-3,4,5,6-tetrahydropyrimidine.

3. 2 - p - tert. - butylphenyl - 3,4,5,6 - tetrahydropyrimidine.

4. 2 - p - octylphenyl - 4,4,6 - trimethyl-3,4,5,6-tetrahydropyrimidine.

5. 2 - (3,5 - ditertiarybutylphenyl) - 4,4,6 - trimethyl-3,4,5,6-tetrahydropyrimidine.

SEAVER A. BALLARD.
RICHARD R. WHETSTONE.

References Cited in the file of this patent
Branch et al.: J. Chem. Soc. 101, 2342–2352 (1912).